April 16, 1940.   F. N. ROSS   2,197,419
SNAP FASTENER INSTALLATION
Original Filed July 6, 1936   2 Sheets-Sheet 1

INVENTOR.
Frederick N. Ross
BY Walter S. Jones
ATTORNEYS.

April 16, 1940.　　　　F. N. ROSS　　　　2,197,419
SNAP FASTENER INSTALLATION
Original Filed July 6, 1936　　　2 Sheets-Sheet 2
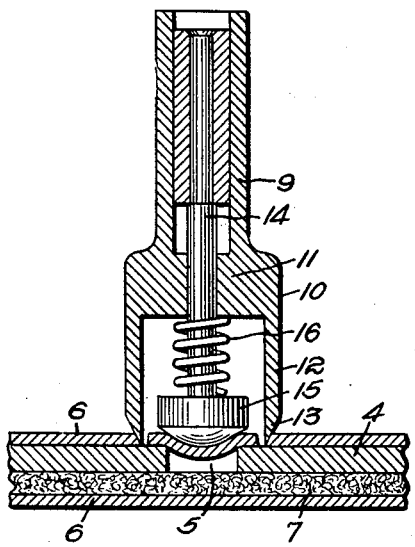
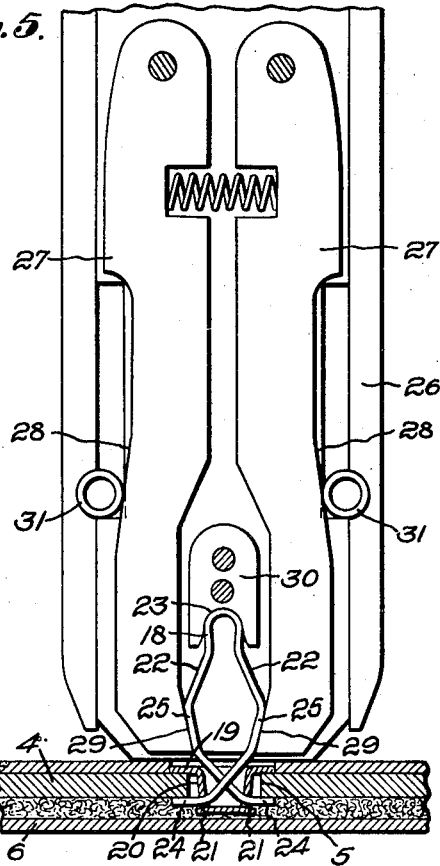
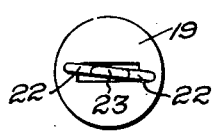
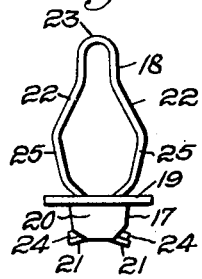
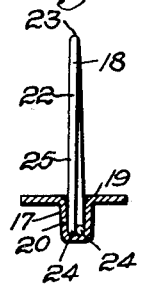
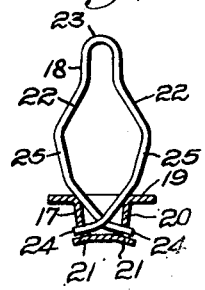
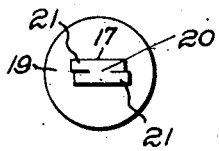
INVENTOR.
Frederick N. Ross
BY Walter S. Jones
ATTORNEYS.

Patented Apr. 16, 1940

2,197,419

UNITED STATES PATENT OFFICE 2,197,419

SNAP FASTENER INSTALLATION

Frederick N. Ross, Detroit, Mich., assignor to Cinch Manufacturing Corporation, Chicago, Ill., a corporation of Illinois Original application July 6, 1936, Serial No. 88,981. Divided and this application August 25, 1937, Serial No. 160,865

2 Claims. (Cl. 45—138)

My invention aims to provide improvements in snap fastener members, installations of the same and methods by which the fasteners are attached to a supporting structure. My improved fastener member is particularly, though not exclusively, useful for securing an upholstery panel to a framework.

This application is a divisional of my copending application Serial No. 88,981, filed July 6, 1936.

In the drawings, which illustrate a preferred embodiment of my invention:

Fig. 4 is a sectional view of an upholstery panel and a tool means by which the finishing material overlapping an aperture on one side of the backing is cut out so as to allow my fastener member to be attached to the panel;

Fig. 5 is a sectional view of an upholstery panel and fastener member showing a portion of the tool means by which the fastener member is finally secured to the panel;

Fig. 6 is a top plan view of my improved fastener member per se;

Fig. 7 is a front elevational view of the fastener member shown in Fig. 6;

Fig. 8 is a bottom plan view of the fastener member shown in Fig. 6;

Fig. 9 is a side view, partly in section, of the fastener member shown in Fig. 6; and Fig. 10 is a front view, partly in section, of the fastener member shown in Fig. 6.

Figure 2:
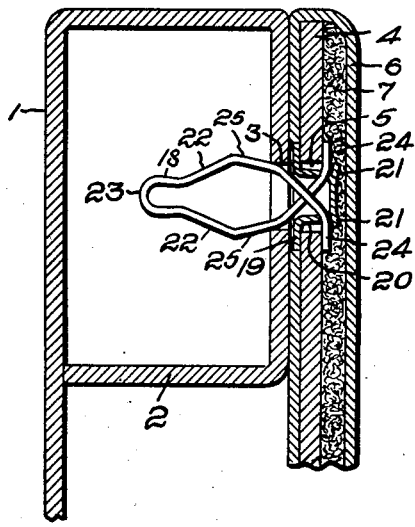
Fig. 2 is a section of a portion of an automobile door with the upholstery panel secured thereto by means of my improved fastener member.

Referring to Fig. 2 of the drawings, I have shown an upholstery installation which comprises a part to be upholstered and an upholstered part for covering one side thereof and a fastener member which engages with the part to be upholstered to hold the upholstered part in assembled relation therewith.

Figure 1:
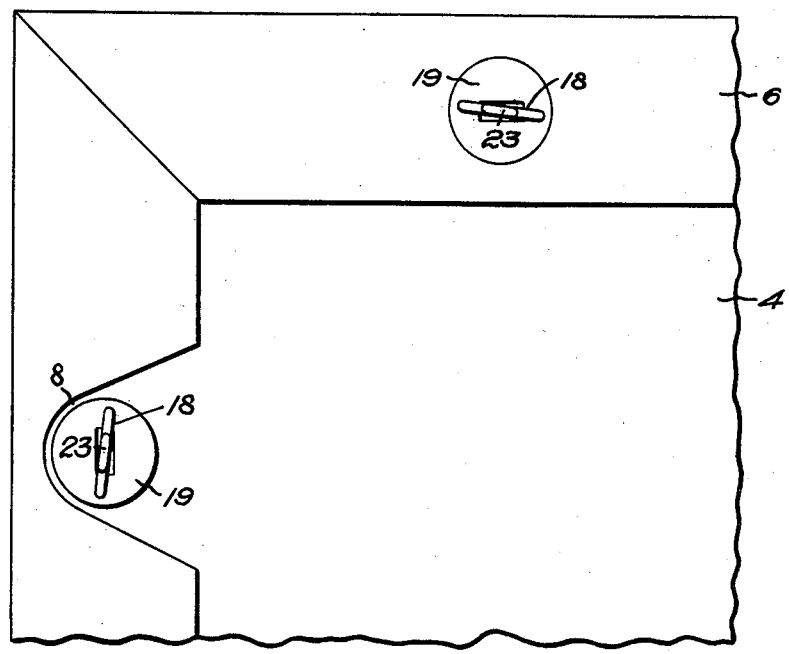
Figure 1 is a fragmentary perspective view of an upholstery panel illustrating the fastener assembly of the invention and showing two ways of attaching the fasteners to the backing through a margin of the finishing material overlapping the backing.
Figure 3:
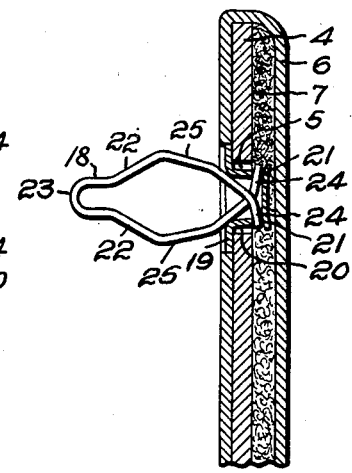
Fig. 3 is a section of a portion of an upholstery panel showing my improved fastener member in position for final attachment thereto.

The part to be upholstered is, as illustrated in Fig. 2, an automobile door 1 having a metal frame 2 which has a stud-receiving aperture 3 formed therein. The upholstery panel, as illustrated in Figs. 1-3, comprises a relatively stiff backing 4 made of cardboard or the like to cover one side of the door 1 and having an aperture 5. The upholstery panel 4 is covered with a flexible finishing material 6 to give a finished appearance to the inside of the door when secured to the frame 2. Between the backing and the cover I have provided a layer of wadding 7 (Figs. 2 and 3) which is useful to the panel installation for a reason which will be described.

The finishing material 6, in my preferred form of upholstery panel, is lapped along the margin of the inside surface of the panel by being glued or otherwise fastened in place, as illustrated in Figure 1. In some forms of upholstery panel the finishing material overlies the preformed apertures 5 of the backing 4. In order that access may be gained to an aperture 5 of the backing for securing my fastener member to the same, I have shown in Figure 1 the finishing material cut out as at 8 around an aperture 5 in a well known manner. However, it has been found that cutting out the finishing material in the manner shown at 8 takes a relatively great amount of time and labor and for that reason I have provided a tool means for removing the finishing material overlapping the apertures of the backing in an efficient and relatively quick manner. The tool means, as illustrated in Fig. 4, is a form of dinking die having an outer casing comprising a sleeve 9 and a base 10. The base 10 has a solid portion 11 integral with the sleeve 9 and a hollow tubular portion 12 having a peripheral cutting edge 13 at its free end. Assembled with the outer casing of the die is a combination stripper and pilot means having a shank 14 extending through the solid portion 11 of the base 10 and slidably mounted within the sleeve 9 and a beveled pilot means 15 provided at one end of the shank 14. The pilot means 15 is normally disposed below the peripheral cutting edge 13 and held in that position against the action of a coil spring 16 disposed between the pilot means 15 and the solid portion 11.

In cutting out the finishing material the upholstery panel is moved under the die until the covered aperture 5 substantially underlies the beveled surface of the pilot means 15, at which time downward pressure is exerted upon the outer casing of the die contracting the coil spring 16 so as to enable the peripheral cutting edge 13 to cut out the portion of the finishing material overlying the aperture 5 and material of the backing 4 adjacent thereto substantially as shown in Fig. 4. The size of the pilot means 15 relative to the tubular portion 12 of the die enables the pilot means to act also as a stripper preventing passage of the cut-out portion of the finishing material into the die. Through use of a locating fixture (not shown) in combination with a suitable press (not shown) carrying my die means it is possible to remove portions of the finishing material overlying apertures in a section of the backing not only in an efficient way, but by a quicker method than has formerly been used for this purpose.

While many forms of stud members have been used in securing upholstery panels to suitable framework, I prefer to use a snap fastener member such as shown in Figs. 6 through 10 preferably formed of two pieces comprising a retaining part 17 and a yieldable socket-engaging part 18 assembled with the retaining part and having a portion combining with the retaining part to secure the fastener member to the panel. The retaining part 17 in my preferred form has a flanged base portion 19 and a hollow cup-shaped portion 20 preferably formed from the material of the base portion 19 and extending beneath the same, as most clearly illustrated in Figs. 7, 9 and 10. The material of the retaining part 17 adjacent to the bottom has been punched outwardly as at 21—21 leaving apertures in the retaining part to receive portions of the socket-engaging part. The socket-engaging part 18 is in the form of a clip member made from one piece of wire which is soft enough to be set in a given position but which has a certain amount of resiliency for holding in the aperture in the frame.

The clip member has a pair of legs 22 connected at their leading ends, as shown at 23, to furnish a certain amount of spring action. The free end portions 24—24 of the legs 22—22 are in crossed relation, as most clearly shown in Figs. 3 and 10, for a purpose which will be described. Intermediate with the connected ends of the legs 22—22 and the respective free end portions 24—24, the legs are bent to provide bowed portions 25—25 shaped and arranged to engage a cooperating socket with a snap action. The clip member 18 is easily assembled with the retaining part 17 by inserting each of the free end portions 24—24 through the respective apertures formed in the cup-shaped portion 20 so that the outermost ends of the portions 24—24 are substantially even with the outer surface of the wall of the cup-shaped portion 20, as most clearly illustrated in Figs. 3, 7 and 10. The free end portions 24—24 are normally set in this position preventing ready removal of the clip member from the retaining part before the snap fastener member is finally attached to the upholstery panel.

To assemble my improved snap fastener with the upholstery panel it is only necessary to insert the cup-shaped portion 20 of the retaining part of the fastener through an uncovered aperture 5 of the backing 4 so that the flange 19 engages the inside surface of the backing 4 adjacent to the aperture (Fig. 3). The wadding 7 is compressed slightly by the bottom of the cup-shaped portion 20 as shown in Figs. 2, 3 and 5 thereby taking up the body of the portion 20 so that no noticeable bulge is formed in the outer, or normally exposed, surface of the upholstery panel. For this reason I prefer to include the wadding 7 in my panel installation because without it it is probable that a slight bump of unevenness would be caused in the finishing material due to the fact, that, in a thin installation, it is necessary that the retaining part 17 extend slightly beneath the backing 4, as shown in Figs. 2, 3 and 5 of the drawings.

To attach permanently the snap fastener member to the upholstery panel pressure is exerted in an inwardly direction upon the bowed portion 25 of each of the arms 22—22 thereby forcing the free end portions 24—24 away from each other beyond the peripheral walls of the cup-shaped portion 20 so as to engage the opposite surface of the backing 4 from the flange means 19. As a result of this action, the end portions 24—24 are set in engagement with the backing 4 and cooperate with the flange 19 to hold the fastener member in rigid assembly with the panel. After my snap fastener members are permanently assembled with the upholstery panel, satisfactory shoulder portions are provided by the arms 22—22 to enable the clip member to engage with a socket means 3 of a support, as shown in Fig. 2, even though the bowed formation of the arms 22—22 has been straightened out to a slight degree as a result of the action by which the end portions 24—24 are set further away from each other.

Any satisfactory tool means may be employed for engaging the arms 22—22 to move the free end portions 24—24 apart so as to become set in engagement with the backing 4, but the tool which I have chosen to illustrate my invention is shown in a general way in Fig. 5, some of the parts of the tool having been removed to show the important parts. In general, the tool illustrated in Fig. 5 is made up with an outer casing 26 having a spring-actuated retaining means, which is not shown in the drawings, slidably mounted within the casing 26. Assembled within the retaining means are a pair of actuating arms 27, each having a camming surface 28 and a portion 29 at its outermost end adapted to engage the bowed portions 25—25 of the socket-engaging part 18 for forcing the arms 22—22 toward each other to move the end portions 24—24 away from each other. A supporting means 30 is positioned between the arms 27—27 for receiving the connected end portion 23 of the clip member when the tool is initially applied to the fastener. In attaching the fastener member to the panel the cup-shaped portion 20 of the retaining member is first extended through an aperture 5 of the backing substantially as described and the tool means is then inserted over the clip member so that the connected portion 23 is seated within the supporting means 30. The outermost ends of the arms 27—27 normally extend below the outermost end of the casing 26 and engage the panel. When downward pressure is exerted upon the casing 26, camming means 31—31 engage the cam surfaces 28—28 of the arms causing the arms to squeeze the legs 22—22 of the clip member toward each other for the purpose which has been described.

After assembly of the parts of the panel the fasteners may be snapped into holes in the frame (Fig. 2) by pressing the panel into place. During this operation the pressure, which might otherwise be against the wadding and covering, is taken up by the bottoms of the cup-shaped attaching members as shown in Fig. 2.

As a result of my invention, I have provided an improved snap fastener member which is simple and relatively inexpensive to manufacture and forms a very convenient method of securing the panel to the door frame. Also by my invention I have provided a quick and efficient method by which the snap fastener member may be attached to the panel.

Although I have illustrated and described a preferred embodiment of my invention, I do not wish to be limited thereby because the scope of my invention is best set forth in the following claims.

I claim:

1. A fastener installation comprising a supporting structure having an aperture therein, an apertured retaining part disposed within said aperture, a stud part assembled with said retaining part and having a portion extending through an aperture of said retaining part and laterally beyond the retaining part and engaged with said support whereby said stud part is secured thereto, and said stud part having a socket-engaging portion extending beyond an outer surface of said support.

2. A fastener installation comprising a supporting structure having an aperture therein, a retaining part extending into the aperture of said supporting part, said retaining part having an apertured wall and a flange at one end of said wall engaging one surface of said support, a stud part assembled with said retaining part, said stud part having a yieldable socket-engaging portion extending laterally beyond a face of said supporting structure, and said stud having free end portions extending through apertures in the wall of said retaining part and engaging the other surface of said support from that engaged by said flange to hold said retaining part and stud part in place.

FREDERICK N. ROSS.